Nov. 10, 1925.
W. M. FRASER
1,561,428
APPARATUS FOR DISTILLATION
Filed June 11, 1923
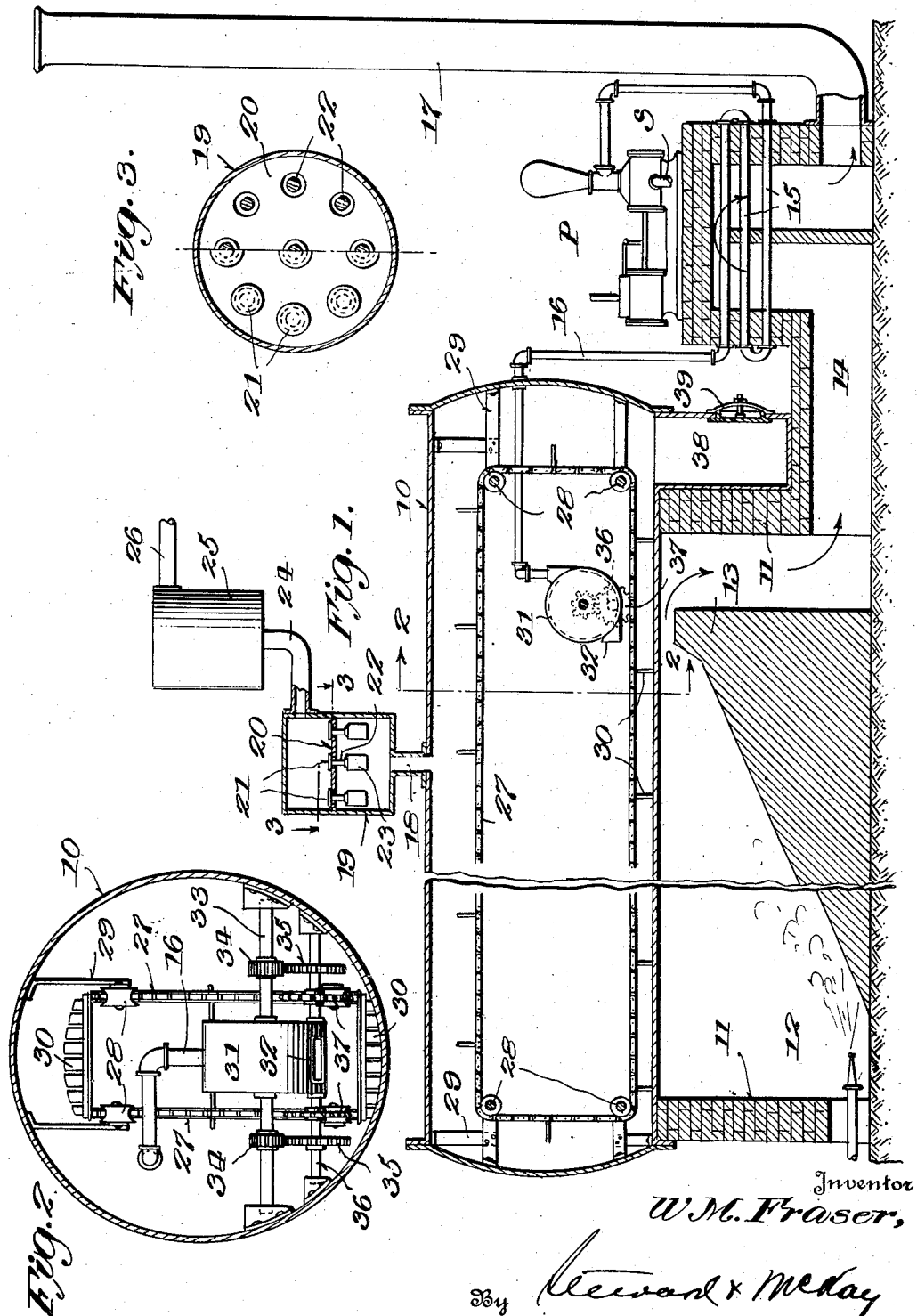

Patented Nov. 10, 1925.

1,561,428

UNITED STATES PATENT OFFICE.

WILLIAM M. FRASER, OF BRISTOW, OKLAHOMA.

APPARATUS FOR DISTILLATION.

Application filed June 11, 1923. Serial No. 644,746.

*To all whom it may concern:*

Be it known that I, WILLIAM M. FRASER, a citizen of the United States, residing at Bristow, county of Creek and State of Oklahoma, have invented certain new and useful Improvements in Apparatus for Distillation; and I do hereby declare the following to be a full, clear, and exact description of the invention, such as will enable others skilled in the art to which it appertains to make and use the same.

This invention relates to apparatus for distillation; and in particular it relates to apparatus useful especially in pressure distillation of liquids, such as mineral oils, for example, and characterized by the fact that the operating pressure is controlled and regulated by means of multiple valve means of such nature that more accurate and dependable pressure regulation and control, as well as smoother and more satisfactory operation in general, are attainable than have been possible heretofore. The invention also comprises novel means for sweeping or scraping the bottom of the still or other heating vessel to clear the same from deposited matter.

In the distillation of liquid material to obtain desired products therefrom, the operation is in some cases conducted under pressure, this pressure being usually the self-imposed pressure of the distillation vapors, that is the pressure generated and maintained by the vapors and gaseous decomposition products of the liquid itself undergoing distillation. Ordinarily it is important to regulate and control the vapor pressure in the vapor space of the distilling vessel within reasonably close limits in order that the products of distillation may possess certain desired properties.

Attempts have been made to accomplish this heretofore by means of a valve placed at some point in the conduit means through which the excess vapors and gases find their way from the distilling vessel, this valve being of the type having but one closing surface, that is, consisting of but a single valve member, usually adjusted manually in an attempt to give the effective outflow capacity permissible in view of the pressure it is desired to maintain in the still. Such prior arrangements are not altogether satisfactory in that they are commonly subject to fairly wide fluctuations of pressure, are not capable of giving as good fractionation or selective separation of the vapors as is desirable, and are otherwise open to objections of a practical nature. One of the objects of the present invention is to overcome these objections and to provide a method and apparatus that enable more accurate and dependable control of the pressure to be had and also, usually, a closer selective separation of the distillation products.

Apparatus for heating liquids has been equipped heretofore in many instances with agitator or like devices, designed in specific instances to sweep or scrape the bottom of the heating vessel and thus free the surface thereof from deposited matter. Such mechanisms have been operated heretofore by driving connections to motor means located outside of the heating vessel. Where the vessel is closed, and especially where it is operated under pressure as in the case of pressure stills, this has necessitated extending a moving driving member through a wall of the vessel, thus requiring the provision of a stuffing box or equivalent device in the still wall, which is obviously objectionable. One of the objects of the present invention is to do away with this and to provide for operation of the agitator, sweep, or scraper means through motor means located wholly within the heating vessel.

Other objects and advantages of the invention will appear more fully as the description proceeds.

While the invention in its broader aspects is of general applicability in various arts involving the heating of a liquid, and more particularly in pressure distillation, it is especially well adapted to, and is primarily designed for, use in pressure distillation of mineral oils for the production of motor fuels or other light products therefrom; and for the sake of a concrete example illustrating the fundamental principles underlying the invention, this specific phase of the invention will be more particularly referred to and described in detail hereinafter.

In the manufacture of light oils such as gasolene and other motor fuels from petroleum and other mineral oil materials, a majority of the various processes in commercial use involve what is known as "cracking" by distillation under fairly high pressure, several atmospheres usually, and at reasonably high temperatures. Pressure stills have heretofore been operated with a valve having one closing surface which is placed in the vapor line between the still and the condenser, or in the condenser outlet, both of which locations may be referred to broadly as in the conduit means affording an outlet from the vapor space of the still. This valve is initially closed against the vapors (condensed or uncondensed) coming from the still until the pressure on the still has been built up to the desired working pressure, whereupon the valve is opened, usually by hand, to an extent sufficient to release and permit the exit of the excess vapors, that is, those which are not required to maintain the pressure at the desired point. It is very difficult to control the operation of such a valve with accuracy, and under the most favorable conditions frequent adjustment is required to attain anything like uniform working conditions in the still.

The present invention makes use of multiple valve means, in place of the single-surface control valve heretofore employed in the art, said multiple valve being of such construction and disposition that the effective flow section or capacity of the vapor line or condenser outlet at the locality in which the multiple valve is placed is subdivided into a plurality of relatively small and most desirably rather constricted passages which, in the aggregate, are approximately equivalent to the total effective flow section or capacity of the vapor line or condenser outlet in question. Apart from any other considerations, this sub-division of the total flow capacity has the advantage of affording a better selective or separating action on the distillation vapors, whereas the type of controlling valve heretofore used in this art allows all distillation vapors, both light and heavy, to pass indiscriminately. Each of the several vapor passages or channels afforded by the multiple valve device employed in the practice of this invention is individually governed by a valve member acting separately from the other valve members governing the rest of the passages or outlets; and these valve members, together with the passages or outlets governed thereby, are in what may be termed parallel arrangement with respect to each other, as distinguished from a series arrangement. This is not to be understood as precluding the employment of two or more multiple valve devices in one vapor line in series arrangement with respect to one another, the present reference being merely to the mutual relation of the valve members of any one multiple valve under consideration.

In a typical instance, let it be assumed that the invention is to be embodied in a pressure still installation for cracking mineral oil, and that the multiple valve is placed in the vapor line between the still and condenser. It is to be understood that this is merely a typical arrangement and that placing the multiple valve beyond the condenser is within the scope of the invention. The several members of the multiple valve are so weighted that they may be lifted or unseated when the pressure in the vapor space of the still attains the predetermined desired amount.

For the attainment of especially good results in the practice of the invention, it is desirable that the several members of the multiple valve be so arranged and adjusted that they do not lift or release at identically the same pressure, but on the contrary lift successively upon relatively very small increments of increase of vapor pressure, thus giving a gradual or step-by-step relief action instead of lifting simultaneously. The valve construction is such that this operation occurs automatically upon attainment of the proper pressure in the still. For example, if the vapor line have an effective diameter of one inch, and it is desired to operate the still at a working pressure of 100 pounds per square inch when distilling oil therein, and assuming for instance the employment of nine members in the multiple valve, the valve seat or plate supporting the multiple valve members may be provided with nine apertures about $1\frac{3}{8}$ inch in diameter, and the neck or stem of each valve member may be say ⅞ inch in diameter, thus giving an effective valve opening of 0.0889 square inch for each valve member, and the nine valve members taken together will have a total effective opening area approximately equal to that of the one-inch vapor line. By weighting each valve member to about 8.5 pounds, the valve will lift at a working pressure of 100 pounds or thereabouts. As before stated, it is desirable to have these weighted valve members graduated so that they do not all act simultaneously, and accordingly it is of advantage to make each differ slightly from the others in weight. In the foregoing instance, for example, one member may be weighted at 8½ pounds, another at $8\frac{9}{16}$ pounds, another 8⅝ pounds, and so on, but always keeping the weights so that the valves will all lift within a relatively narrow range approximating the working pressure desired, which is 100 pounds in the case assumed. If a different working pressure is desired, the weights of the valve members can be changed accordingly.

The multiple valve employed in the present invention may be of any approved construction, suitable for the purpose in view. In practice, it is generally most convenient to employ a horizontally disposed septum in an enlargement of the vapor conduit, this septum serving as a valve plate carrying the plurality of valve members which seat in apertures in the septum. The valve members are desirably pendulous, that is, the larger part of the acting weight is suspended below the septum. It is however entirely feasible to use a multiple valve construction in which the acting weights are superimposed upon the seating elements. In any case the openings in the septum and the acting weights should be carefully calibrated in order to get the desired working pressure with proper accuracy.

One multiple valve may be used in practicing the invention, or several multiple valves may be used in series. It is often desirable to release vapors which separate at various pressures for fractionation purposes. Under such conditions it is feasible to arrange a series of multiple valves in the vapor line, each valve releasing vapors of the particular type to be segregated at the pressure desired from the valve chamber of the properly weighted valve. When a series of multiple valves is employed, the heaviest weighted valve is placed nearest to the still, and the lightest weighted valve farthest from the still. The multiple valves of the series may be arranged at the same or different levels, as circumstances may require.

When operating pressure still for cracking purposes, much difficulty is usually encountered through the formation and deposition of free carbon in the form of coke on the bottom of the still which is subjected to the intense heat of the direct fire underneath. This coke forms a hard deposit which is difficult to remove, if left there during the entire distillation, and in time it will cause the destruction of the still through the resultant overheating of the bottom. Furthermore, the insulating effect of this coke layer necessitates excessive fuel consumption to distill the oil.

According to the present invention in one of its most desirable specific phases, provision is made for removing this coke or carbon deposit by means of sweep or scraper mechanism which sweeps or scrapes the bottom of the still and removes the carbon deposit to a place of discharge. Instead of actuating this sweeper mechanism by a motor device arranged outside the still, as is usual, the driving motor is located wholly within the still, thus avoiding the necessity for extending moving parts through the still wall and the complications ensuing thereupon. Moreover, in the most desirable form of the invention, the actuating motor may be of the fluid motor type driven by the oil fed into the still under pressure for distillation.

A further understanding of the principles of the invention may be gained from a description of a desirable practical embodiment thereof shown in the accompanying drawings which illustrate more or less diagrammatically a typical apparatus installation within the scope of the invention. In these drawings, Fig. 1 is a central vertical longitudinal section through the main parts of the installation;

Fig. 2 is a vertical transverse section through the still on the line 2—2 of Fig. 1; and Fig. 3 is a horizontal transverse section through one of the multiple valve chambers on the line 3—3 of Fig. 1.

Referring to the drawings, 10 is a pressure still of the horizontal cylindrical type supported in brick-work 11 and fired by any suitable means such as oil-burner 12, the flame and hot gases from which contact directly with the still bottom. After passing over bridge wall 13 the hot gases go through flue 14, and in this instance are led into contact with a pre-heater coil 15 through which crude oil or other starting material is forced from a supply tank (not shown) by means of a pump P before passing into the still by way of supply or feed pipe 16 which will be further referred to hereinafter, the waste gases finally escaping through a suitable stack 17. Oil vapors generated in the pressure still 10 exit through vapor pipe 18, and said vapors or such portion thereof as escape preliminary condensation and refluxing to the still eventually pass to a condensing system (not shown), fixed gases leaving the condensing system through a discharge outlet which may be of any suitable type. In accordance with the invention, multiple valve means are provided to maintain a predeterminable pressure on the still and, if desired, upon the condenser also. In the present illustrative example, said multiple valve means is disposed in the vapor line between the still and the condenser, the self-imposed pressure due to vaporization in the still being upon the still only. Where the multiple valve is placed beyond the condenser, which is within the scope of the invention, such pressure extends to and through the condenser. The multiple valve means may take various specific forms. In the present instance the vapors after leaving the still through off-take 18 enter a box or chamber 19 above the still. This chamber is divided into an upper and a lower portion by a septum 20 which provides a valve plate having a plurality of circular apertures, nine in this instance, controlled by a corresponding number of pendulous relief valves, each of which has circular head 21 seating upon the margin of the cooperating aperture, a stem 22 extending through the plate, and a depending weighting portion 23. The stem 22 is of slightly less diameter than the aperture through which it extends, thus providing an annular valve opening adapted to be closed by seating of the head 21 upon the margin of the corresponding circular aperture in the valve plate. As previously explained, the individual members of the multiple valve device are so dimensioned and weighted as to lift or release at approximately the desired operating pressure on the still.

In the present example two multiple valve devices are arranged in series in the vapor line. As already pointed out, it is feasible to employ only one such multiple valve device; but in some cases the employment of two or more in series is advantageous, particularly because of the enhanced dephlegmating effect thereby attained, with resultant improved separation of the particular fraction sought at a given operating pressure and temperature. Accordingly, in the apparatus here illustrated, vapors passing the described valve members or stoppers and entering the upper part of chamber 19 pass therefrom through vapor pipe 24, constituting a continuation of the vapor line, into the lower part of a second valve box or chamber 25 which may be similar in all respects, including the multiple valve device therein, to chamber 19 previously described. The weighting of the valve members in box 25 may desirably be somewhat less than the weighting of those in the preceding multiple valve. Vapors leave the upper portion of the chamber 25 through vapor pipe 26 and are conducted thereby to a condensing system as aforesaid, either with or without passage through one or more additional valve chambers similar to 19 and 25.

It will be seen that the action of the multiple valve devices is entirely automatic in the apparatus here illustrated, the individual members of the multiple valve being so designed and calibrated as to lift at about the desired working pressure, or within a small range including said pressure, this lifting being most desirably successive as previously pointed out, so that the entire effective opening of the multiple valve device does not occur at once but is attained gradually in accordance with the gradual increase in vaporization and building up of pressure as the still heats up. In general, therefore the arrangement provides for accurate and automatic regulation of the quantity of vapors permitted to leave the still, whether the rate of vaporization be increasing or decreasing, thus making for relatively smooth and uniform operation of the still under approximately constant pressure, as contrasted with the unsteady and fluctuating conditions resulting from the action of single surface pressure-controlling valves heretofore employed in the vapor lines of pressure stills. It is apparent also that the arrangement provided by the present invention produces a particularly effective dephlegmating effect upon the vapors, permitting a selective passage of only the lighter portion of the vapors through the multiple valve means, while the heavier portions tend to be retained on that side of the valve toward the still, where they may condense and reflux to the still. In the case of the first valve chamber 19, in the construction here illustrated, the heavier vapors that may condense in the lower portion of the chamber can reflux directly to the still through offtake 18; while those condensed in the lower part of chamber 25 can drain back through pipe 24 and fall upon plate 20 to form a layer through which vapors passing the individual valve members bubble, fractionation being thereby effected. Instead of allowing condensate to flow back from one valve chamber into the upper portion of the next preceding valve chamber, provision may of course be made for by-passing it through a properly valved line to the suction or intake pipe S of the pump P which feeds the still.

In the most desirable form of apparatus within the invention, provision is also made for sweeping or scraping the bottom of the still to clear it of coky deposits of free carbon which necessarily separates as a result of cracking under pressure. As here illustrated, the still is therefore equipped with endless chain mechanism designated generally at 27, carried upon grooved rollers or idlers 28 which are supported in proper position within the still by suitable bracket means or framework 29. This chain mechanism carries scrapers or plows 30. The scraper mechanism thus far described may be of a type well known in the art. In order to actuate the scraper mechanism, a motor device of appropriate character is located entirely within the still, according to the present invention, and is suitably geared to the scraper mechanism to drive the same. In the present instance, the feed of crude oil or the like that is pumped into the still under pressure is utilized as the source of power to operate the aforesaid motor device which therefore takes the form in this case of a fluid-actuated motor 31 to which the oil feed is pumped under sufficient pressure through supply pipe 16, said oil feed after being utilized to actuate the motor then passing out of the motor housing through discharge outlet 32 and entering the still to undergo distillation. The motor 31, which is conventionally shown, may be of the ordinary paddlewheel type or of the turbine type, the latter being more efficient and therefore to be preferred. The motor shaft 33 has any suitable form of driving connection to the scraper mechanism. It is shown in this instance as carrying driving pinions 34 which engage gears 35 on counter shaft 36, said counter shaft carrying sprockets 37 which engage and drive the endless carrier chains 27 of the scraper mechanism. The scraper mechanism is so driven that deposited material is moved toward the rear of the still and discharged into a pocket-like receptacle 38 provided at the rear end for collecting coke and other deposits removed by the scraper mechanism. This receptacle 38 is shielded by a part of the brickwork 11 from the hot gases of the heating furnace so that carbon deposited therein is not overburned but is removable as a sludge through the covered clean-out opening indicated at 39.

This arrangement for clearing the bottom of the still from accumulations of coke and the like is simple and effective and has the great advantage of entirely avoiding the use of movable driving connections extending through the wall of the still. It is believed to be broadly novel to provide an arrangement of this general character in closed vessels for heating liquids, especially under pressure.

While certain specific embodiments of the invention offering advantages in practical work have been hereinabove disclosed, it is to be understood that these are merely typical of embodiments within the scope of the invention defined by the appended claims.

What I claim is:

1. Apparatus for heating liquids comprising the combination, with a closed vessel, for heating liquid, means for feeding liquid into said vessel, of agitator means located in said vessel, and a fluid motor located within said vessel and connected to said liquid-feeding means for operation by the latter and arranged to be driven by liquid fed through said liquid-feeding means.

2. Distilling apparatus comprising the combination, with a still, of sweep or scraper mechanism mounted therewithin for cleaning deposited matter from the bottom thereof, means for feeding liquid under pressure to said still, and fluid motor means located within said still and connected to such liquid-feeding means, said motor means having a driving connection to said sweep or scraper mechanism, said motor means being arranged to be driven by the liquid fed to said still.

In testimony whereof I hereunto affix my signature.

WILLIAM M. FRASER.